US012612045B2

(12) United States Patent
Käfer et al.

(10) Patent No.: US 12,612,045 B2
(45) Date of Patent: Apr. 28, 2026

(54) METHOD FOR AUTOMATICALLY REGULATING A LONGITUDINAL MOVEMENT OF A VEHICLE

(71) Applicant: MERCEDES-BENZ GROUP AG, Stuttgart (DE)

(72) Inventors: Eugen Käfer, Renningen (DE); Frank Lindner, Ulm (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 114 days.

(21) Appl. No.: 18/704,107

(22) PCT Filed: Sep. 19, 2022

(86) PCT No.: PCT/EP2022/075947
§ 371 (c)(1),
(2) Date: Apr. 24, 2024

(87) PCT Pub. No.: WO2023/072478
PCT Pub. Date: May 4, 2023

(65) Prior Publication Data
US 2024/0409101 A1      Dec. 12, 2024

(30) Foreign Application Priority Data

Oct. 26, 2021    (DE) ..................... 10 2021 005 311.7

(51) Int. Cl.
B60W 40/04            (2006.01)
(52) U.S. Cl.
CPC ....... B60W 40/04 (2013.01); B60W 2420/403 (2013.01); B60W 2555/60 (2020.02)
(58) Field of Classification Search
CPC .............. B60W 30/025; B60W 30/16; B60W 30/18154; B60W 40/04; B60W 40/10;
(Continued)

(56) References Cited

U.S. PATENT DOCUMENTS 10,124,804 B2    11/2018  Yaldo et al.
11,987,245 B2 *   5/2024  Sakakura ............. G06V 20/584
(Continued)

FOREIGN PATENT DOCUMENTS

DE      102018108366 A1    10/2018
EP          3599141 A1     1/2020
(Continued)

OTHER PUBLICATIONS

International Search Report and Written Opinion mailed Dec. 6, 2022 in related/corresponding International Application No. PCT/EP2022/075947.
(Continued)

*Primary Examiner* — Brandon Z Willis
(74) *Attorney, Agent, or Firm* — PATENT PORTFOLIO BUILDERS PLLC

(57)          ABSTRACT

A longitudinal movement of a vehicle is automatically regulated by detecting, using recorded signals of an environment sensor system an environment of the vehicle and objects located. A state of a traffic light system to be accounted for by the vehicle at a traffic light signal controlled junction in order for the vehicle to pass through the junction is determined. When the vehicle approaches the junction, it is recognized that a view of the environment sensor system of the traffic light system may be obscured by a vehicle in front, then a minimum distance of the vehicle to the vehicle in front is determined depending on a current position of the vehicle in relation to the traffic light system and in relation to the vehicle in front, which minimum distance is used as the basis of the automatic regulation of the longitudinal movement and is not undershot by the vehicle.

3 Claims, 3 Drawing Sheets

Figure 1:
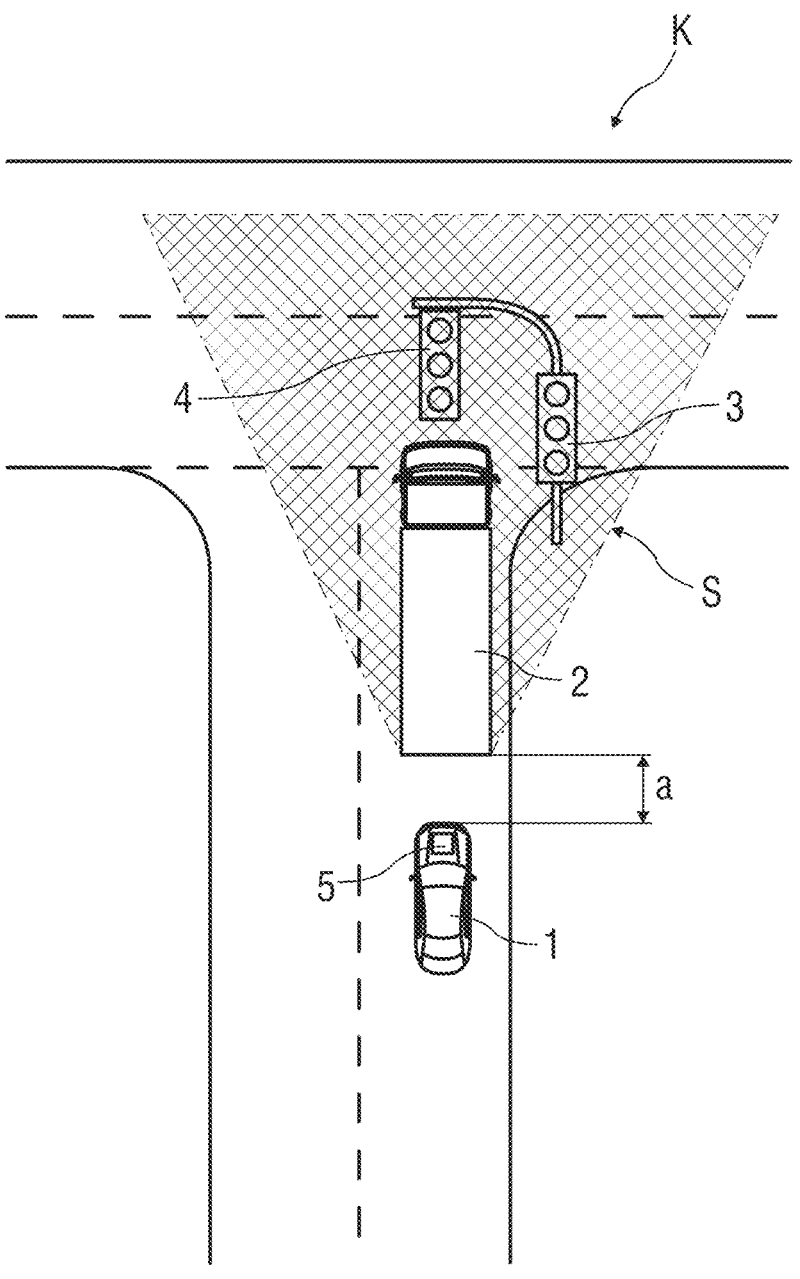

(58) Field of Classification Search
CPC ......... B60W 40/107; B60W 2420/403; B60W 2420/408; B60W 2554/80; B60W 2554/802; B60W 2554/20; B60W 2554/4023; B60W 2555/60; B60W 2720/10; B60W 2720/106; B60W 2754/10; B60W 2754/30; G06V 20/56; G06V 20/58; G06V 20/582; G06V 20/584; G05D 1/65
See application file for complete search history.

(56) References Cited

U.S. PATENT DOCUMENTS

| | | | |
|---|---|---|---|
| 2018/0012088 A1* | 1/2018 | Matsuo | G08G 1/09623 |
| 2019/0130198 A1 | 5/2019 | Hayashi | |
| 2019/0344801 A1 | 11/2019 | Ishii et al. | |
| 2020/0026935 A1* | 1/2020 | Hayashi | G06V 20/582 |
| 2021/0221370 A1* | 7/2021 | Lanfranco | G06V 20/584 |
| 2021/0291868 A1* | 9/2021 | Okuda | B60W 60/0015 |
| 2021/0327276 A1 | 10/2021 | Asai et al. | |
| 2023/0109372 A1* | 4/2023 | Ota | B60W 30/181 701/70 |
| 2023/0133131 A1* | 5/2023 | Naserian | B60K 37/00 345/7 |

FOREIGN PATENT DOCUMENTS

| | | |
|---|---|---|
| EP | 3693244 A1 | 8/2020 |
| EP | 4059795 A1 | 9/2022 |
| JP | 2004301833 A | 10/2004 |
| JP | 2009001245 A | 1/2009 |
| JP | 2013184664 A | 9/2013 |
| WO | 2012166170 A1 | 12/2012 |
| WO | 2021094802 A1 | 5/2021 |

OTHER PUBLICATIONS

Office Action created Jul. 22, 2022 in related/corresponding DE Application No. 10 2021 005 311.7.
Office Action dated Apr. 1, 2025 in related/corresponding JP Application No. 2024-525082.
Office Action dated Feb. 19, 2026 in related/corresponding KR Application No. 10-2024-7011838.

* cited by examiner

METHOD FOR AUTOMATICALLY REGULATING A LONGITUDINAL MOVEMENT OF A VEHICLE

BACKGROUND AND SUMMARY OF THE INVENTION

Exemplary embodiments of the invention relate to a method for automatically regulating a longitudinal movement of a vehicle, wherein an environment of the vehicle and objects located in it are detected using recorded signals of an environment sensor system and a state of a traffic light system to be taken into account by the vehicle at a traffic light signal-controlled junction in order for the vehicle to pass through the junction is determined.

WO 2012/166170 A1 discloses a method for controlling a vehicle in an autonomous operating mode comprises the steps:

controlling an operation of the vehicle by a processor based on a first control strategy, identifying a sensor field based on a field of view of one or more sensors of the vehicle, receiving sensor data from selected ones of the one or more sensors, identifying a change of the sensor perception of the one or more sensors based on the sensor data, wherein the change of the sensor perception comprises a reduced ability to recognize objects inside the sensor field, specifying a second control strategy based on the change, and controlling the operation of the vehicle by the processor based on the second control strategy.

Exemplary embodiments of the invention are directed to a method for automatically regulating a longitudinal movement of a vehicle.

A method for automatically regulating a longitudinal movement of a vehicle provides that an environment of the vehicle and objects located in it are detected using recorded signals of an environment sensor system and a state of a traffic light system to be taken into account by the vehicle at a traffic light signal-controlled junction in order for the vehicle to pass through the junction is determined. According to the invention, when the vehicle approaches the junction, it is recognized that a view of the environment sensor system of the traffic light system may be obscured by a vehicle in front, and if it is recognized that the view of the environment sensor system of the traffic light system may be obscured by the vehicle in front, then a minimum distance of the vehicle to the vehicle in front is determined depending on a current position of the vehicle in relation to the traffic light system and in relation to the vehicle in front, where minimum distance is used as the basis of the automatic regulation of the longitudinal movement and is not undershot by the vehicle.

By using the method it can be excluded as far as possible that the view of the environment sensor system of the vehicle, which in particular drives in the automated driving operation, of the traffic light system may be obscured, by a vehicle in front, for example a heavy goods vehicle.

In particular, the method optimizes the interaction with a particularly high and/or wide vehicle that is in front in a junction region and casts a sensor shadow and obscures the view of the traffic light system. In such a case, the minimum distance of the vehicle to the vehicle travelling in front is adapted in such a way that a traffic signal system appearing relatively suddenly out from the sensor shadow does not represent a surprise for the vehicle, causing the latter to brake abruptly. Thus, by using the method, the traffic light system appearing suddenly out from the sensor shadow represents a calculated risk.

In an embodiment of the method, the minimum distance is set in such a way that when the minimum distance between the vehicle and the vehicle in front is reached, the environment sensor system has a clear view of the traffic light system that is not obscured by the vehicle in front. The vehicle thus drives with the minimum distance to the vehicle or stops behind the vehicle while maintaining the minimum distance so that the environment sensor system has a clear view of the traffic light system and can react accordingly to a state of the latter.

In a development of the method, a sensor shadow cast by the vehicle in front for the environment sensor of the vehicle is determined, in order to use the sensor shadow to determine whether the sensor system has a clear view of the traffic light system. In this case, a sensor shadow is understood as meaning the obscured view for the environment sensor.

Furthermore, a possible embodiment of the method provides that a next possible position of a traffic light system is specified as a hypothesis, in particular as the most unfavorable case, in the sensor shadow. In this case, the next possible position of a traffic light system is assumed for determining the minimum distance so that the vehicle can react comparatively comfortably to the traffic light system, as long as one is actually located there.

In a further possible embodiment, red is assumed as a state of the traffic light system at the next possible position, in particular as the most unfavorable case for the vehicle. Using this assumption, the vehicle can come to a standstill at the traffic light system with a comfortable stopping maneuver.

To this end, in a further development it is provided that the vehicle determines a comfortable stopping distance according to the hypothesis as a function of its current travelling speed and this is predetermined as a minimum distance to the next possible position of the traffic light system. In particular, the stopping distance is determined according to the hypothesis that it can be excluded as far as possible that the vehicle has to react suddenly to a traffic light system showing red and an abrupt braking maneuver is initiated, whereby occupants of the vehicle could be unnerved.

In one possible embodiment of the method, if a position of a traffic light system relevant for the vehicle is known, e.g., based on existing map data, a minimum distance to this known position of the traffic light system is reduced. In other words, no further determination takes place in such a case, but the longitudinal movement is regulated with respect to this minimum distance in relation to the known position of the traffic light system.

Exemplary embodiments of the invention are explained in more detail below using the drawings.

BRIEF DESCRIPTION OF THE DRAWING FIGURES

Figure 2:
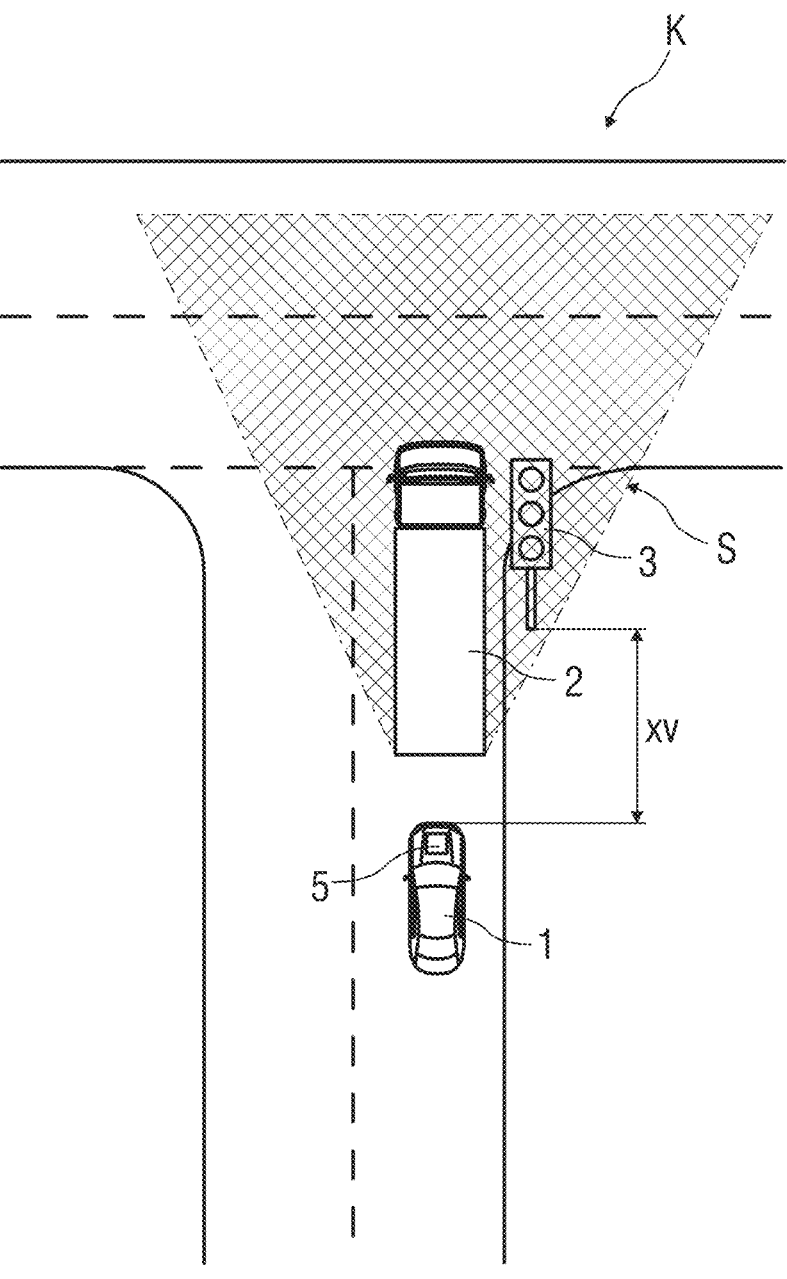
Figure 3:
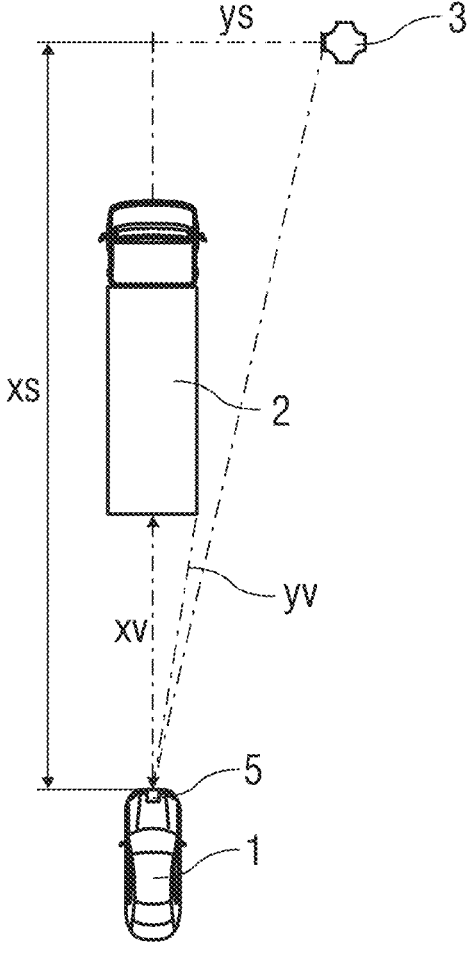

Here:

FIG. 1 schematically shows a traffic situation with a vehicle and a traffic light system obscured by a vehicle in front, FIG. 2 schematically shows a further traffic situation with the vehicle, which has a determined minimum distance to the vehicle in front, and FIG. 3 schematically shows an overview for determining the minimum distance.

Parts corresponding to each other are provided with the same reference numerals in all the figures.

DETAILED DESCRIPTION

FIG. 1 shows a traffic situation at a junction K with a vehicle 1 and a vehicle 2 driving in front of the latter which is embodied as a heavy goods vehicle 2.

FIG. 2 shows a further traffic situation in which the vehicle 1 has a determined minimum distance xv to the vehicle 2 in front and FIG. 3 presents an overview for determining the minimum distance xv.

The junction K is controlled by a traffic signal, with a traffic light system 3 located on the roadside and a synchronized further traffic light system 4 hanging from a so-called mast arm pole.

The vehicle 1 drives in the automated driving operation, wherein an environment of the vehicle 1, in particular an environment lying ahead, and objects found in this are detected using recorded signals of an exemplary and greatly simplified environment sensor system 5.

Additionally, a state of the traffic light systems 3, 4 to be taken into account when passing through the junction K is recognized using the recorded signals of the environment sensor 5.

According to the exemplary embodiment shown in FIGS. 1 to 3, the vehicle 1 drives behind the comparatively large vehicle 2, which could also be a bus, towards the traffic light-controlled junction K.

If the vehicle 1, as shown in FIG. 1, drives behind the vehicle 2 in front with too a short distance a, the environment sensor system 5 would be denied a view of the traffic light systems 3, 4 by the vehicle 2 in front. In this case, both the traffic light system 3 on the roadside as well as the further traffic light system 4 above can be obscured from view by the vehicle 2 in front, with FIGS. 1 and 2 showing an obscured view S, which is also referred to as sensor shadow S, by means of a crosshatched area.

A consequence of this can be that the vehicle 1 approaches the traffic light systems 3, 4, which display red with a comparatively higher driving speed and the vehicle 2 in front was still able to pass through the junction K. Thus, the driving vehicle 1, in particular in the automated driving operation, is forced to initiate dynamic braking, i.e., a comparatively hard braking maneuver, in order to bring the vehicle 1 to a standstill at the traffic light system 3, 4 displaying red, whereby occupants of the vehicle 1 could be scared and/or injured.

It is also possible that an angle between the environment sensor system 5 and in particular the further traffic light system 4 is too large when the latter appears out from the obscured view S of the vehicle 2 in front, such that further traffic light system 4 is located outside of a recording region of the environment sensor system 5.

In order to enable, as much as possible, a relatively comfortable automated driving operation for the vehicle 1 in such a situation a method for regulating a longitudinal movement of the vehicle 1 is described below.

The method provides that if the vehicle 1 comes close to a traffic light-controlled junction K and a state of the traffic light system 3, 4 is to be taken into account by the vehicle 1 when the vehicle passes through the junction K, when the vehicle 1 approaches the junction K it is recognized if the vehicle 2 in front obscures the traffic light system 3, 4 from view of the environment sensor system 5.

If it is determined that the traffic light system 3, 4 is obscured from view to the environment sensor 5 by the vehicle 2 in front, a minimum distance xv of the vehicle 1 to the vehicle 2 in front is determined depending on a current position of the vehicle 1 in relation to the traffic light system 3, 4 and in relation to the vehicle 2 in front, as shown in more detail in FIG. 3.

In order to enable the traffic light system 3 to be located in the recording region of the environment sensor system 5 such that a state of the traffic light system 3 can be recorded, it is required that a ratio of a first distance ys to a second distance xs is larger than a ratio of a third distance yv to a fourth distance xv.

Thus, the first distance ys represents a distance between a central line of the vehicle 2 in front to an inner corner of the traffic light system 3, whereas the second distance xs reflects a straight line distance between the environment sensor system 5 of the vehicle 1 and an extension of the first distance ys.

The third distance yv extends from the environment sensor system 5 up to an outer corner of the vehicle 2 in front and the fourth distance xv represents the minimum distance xv between the vehicle 1 and the vehicle 2 in front.

This approach can be used similarly for the further traffic light system 4 that is arranged above and also for a traffic light system (not shown) arranged on the left-hand side. For a further traffic light system 4 arranged on a mast arm pole, a minimum height of the further traffic light system 4 is relevant because in the most unfavorable case of a comparatively lower hanging traffic light system 4 this is obscured, for example by a semi-trailer.

The relative position of the traffic light system 3 can be deduced by a high-resolution map or a prior sighting of the traffic light system 3. In addition, the relative position and the driving speed of the vehicle 2 in front is calculated by assistant systems via recorded radar, lidar, and/or camera-based signals. The minimum distance xv to be observed is therefore greater than/equal to yv*xs/ys, whereby the vehicle 1 is accordingly accelerated or decelerated.

Such a high-resolution map contains the position of a traffic light system 3,4 with the same high precision with which the vehicle 1 is located. Lines of sight of the environment sensor system 5 can be calculated therefrom, by means of which the relevant traffic light system 3, 4 ought to be visible. If these calculated lines of sight encounter the vehicle 2 in front or intersect the vehicle 2 in front or the prediction thereof assuming an identical movement of the vehicle 2 in front, in particular in relation to driving speed and acceleration, the vehicle 1 can react accordingly, such that the line of sight records the corresponding traffic light system, 3, 4.

The obscured view S, i.e., the sensor shadows S, which the vehicle 2 in front casts for the environment sensor system 5 of the vehicle 1, is determined, in particular calculated, by the vehicle 1 in relation to the vehicle 2 in front.

Then, in the sensor shadow S, a next possible position of a potential traffic light system 3 is determined, which is used as a worst-case assumption, as the vehicle 1, i.e., a vehicle-side system, has no proof that a traffic light system 3 is not located there.

In addition, a state of the traffic light system 3 is assumed as red, as this circumstance is similarly represented as a most unfavorable case for the vehicle 1. The environment sensor system 5 of the vehicle 1 is subsequently able to recognize this hypothetically nearest traffic light system 3, when this is no longer obscured by the vehicle 2 in front and thus no longer located in the sensor shadow S. If the traffic light system 3 then displays red as a state, the vehicle 1 can come to a standstill with a comparatively comfortable stopping maneuver in front of the traffic light system 3. So that this is possible, the vehicle 1 has to know a stopping distance up to the traffic light system 3 depending on its driving speed, and this additionally adjust this to the minimum distance xv in relation to the regulation of the longitudinal movement. Thus, as far as possible, it can be avoided that the vehicle 1 drives up too close to the vehicle 2 in front and is surprised by a traffic light system 3 suddenly standing there and displaying red.

If the position of the traffic light system 3, 4 relevant for the vehicle 1 is known, for example, based on map data available to the vehicle, a hypothetical area can be restricted to this position of the traffic light signal 3, 4 from the map data.

Furthermore, recognition of a transverse street as an indication of a junction K can also restrict the hypothetical area.

A navigation map with an entry of the junction K with traffic light systems 3, 4 without an exact indication of the position of the individual traffic light systems 3, 4 enables the vehicle 1 to adhere to an appropriate minimum distance xv from the vehicle 2 in front, which is potentially at least partially obscuring the view of the environment sensor system 5, in good time before reaching the junction K, in order to enable the environment sensor system 5 to have a free view at least of the traffic light system 3.

The method can similarly be used without existing map information. Should the view of a traffic light system 3, 4 be unobscured when the vehicle 1 is a greater distance from the system but disappears when the vehicle 1 approaches the vehicle 2 in front, a previously estimated position of the vehicle 1 can be used in order to calculate the lines of sight, in the same way as with highly accurate map data.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for automatically regulating a longitudinal movement of a vehicle, the method comprising:

detecting, using recorded signals of an environment sensor system of the vehicle, an environment of the vehicle and objects located in the environment of the vehicle;

determining a state of a traffic light system to be taken into account by the vehicle at a traffic light signal-controlled junction in order for the vehicle to pass through the traffic light signal-controlled junction;

determining by the vehicle, as the vehicle approaches the traffic light signal-controlled junction, that a view of the traffic light system by the environment sensor system may be obscured by another vehicle in front of the vehicle;

determining a sensor shadow cast by the another vehicle in front of the environment sensor system of the vehicle;

determining a hypothesis of a nearest possible position of the vehicle to the traffic light signal-controlled junction at which the environment sensor system of the vehicle is not obscured by the another vehicle;

determining, by the vehicle as a function of the vehicle's current traveling speed, a stopping distance according to the hypothesis of the nearest possible position of the vehicle to the traffic light signal-controlled junction at which the environment sensor system of the vehicle is not obscured by the another vehicle;

determining, responsive to determining that the view of the environment sensor system of the traffic light system may be obscured by the another vehicle in front of the vehicle, a minimum distance of the vehicle to the another vehicle in front depending on a current position of the vehicle in relation to the traffic light system and in relation to the another vehicle in front; and automatically regulating, responsive to the another vehicle being in front of the vehicle and that the traffic light system is to be taken into account by the vehicle, the longitudinal movement of the vehicle so that the determined minimum distance is maintained between the vehicle and the another vehicle in front and the vehicle stops within the minimum distance to the next possible position of the traffic light system at which the environment sensor system of the vehicle is not obscured by the another vehicle, wherein red is assumed as a state of the traffic light system at the next possible position of the traffic light system.

2. The method of claim 1, wherein the minimum distance is specified in such a way that when the minimum distance between the vehicle and the another vehicle in front is reached, the environment sensor system has a clear view of the traffic light system that is not obscured by the another vehicle in front.

3. The method of claim 1, wherein when the position of the traffic light system is known, the minimum distance to the position of the traffic light system is reduced.

* * * * *